(12) United States Patent
McLean

(10) Patent No.: US 6,889,193 B2
(45) Date of Patent: May 3, 2005

(54) METHOD AND SYSTEM FOR SMART CROSS-FADER FOR DIGITAL AUDIO

(75) Inventor: James Gordon McLean, Fuquay-Varina, NC (US)

(73) Assignee: International Business Machines Corporation, Armonk, NY (US)

(*) Notice: Subject to any disclaimer, the term of this patent is extended or adjusted under 35 U.S.C. 154(b) by 664 days.

(21) Appl. No.: 09/808,503

(22) Filed: Mar. 14, 2001

(65) Prior Publication Data

US 2002/0133357 A1 Sep. 19, 2002

(51) Int. Cl.⁷ .................................................. G10H 1/36
(52) U.S. Cl. .................... 704/500; 84/610; 434/307 A
(58) Field of Search ........................... 704/500; 84/610; 434/307 A

(56) References Cited

U.S. PATENT DOCUMENTS

| | | | |
|---|---|---|---|
| 4,644,400 A | | 2/1987 | Kouyama et al. |
| 5,454,723 A | * | 10/1995 | Horii ...................... 434/307 A |
| 5,488,669 A | * | 1/1996 | Zampini et al. ............ 381/119 |
| 5,687,240 A | | 11/1997 | Yoshida et al. |
| 5,747,716 A | * | 5/1998 | Matsumoto ................... 84/609 |
| 5,753,844 A | | 5/1998 | Matsumoto |
| 5,842,172 A | | 11/1998 | Wilson |
| 5,919,047 A | * | 7/1999 | Sone ....................... 434/307 A |
| 5,955,691 A | | 9/1999 | Suzuki et al. |
| 6,278,048 B1 | * | 8/2001 | Lee ............................. 84/610 |

* cited by examiner

Primary Examiner—Susan McFadden
(74) Attorney, Agent, or Firm—Sawyer Law Group LLP

(57) ABSTRACT

The present invention provides an improved system and method for cross-fading digital audio files. The method includes determining a plurality of characteristics for a first and a second digital audio files; associating the plurality of characteristics with the first and the second digital audio files; automatically, i.e., without user input, determining an appropriate cross-fading method for the first and the second digital audio files based upon the plurality of characteristics when the first and the second digital audio files are to be cross-faded; and automatically cross-fading the first and the second digital audio files in accordance with the cross-fading method. In this manner, digital audio files are more appropriately cross-faded without the need for cumbersome user input.

19 Claims, 6 Drawing Sheets

US 6,889,193 B2

METHOD AND SYSTEM FOR SMART CROSS-FADER FOR DIGITAL AUDIO

FIELD OF THE INVENTION

The present invention relates to digital audio, and more particularly to the cross-fading of audio files.

BACKGROUND OF THE INVENTION

Customized digital storage, transmission, and presentation of digital audio files is fast becoming a multi-billion dollar business. The advent of compressed audio formats such as MP3 and associated players, along with vast personal and public audio repositories and media distribution systems, means that anyone can collect, transfer, and combine audio files into a "personal radio station". An automated approach can be used to "cross-fade" audio files (i.e., start a new audio file as another is fading out). However, a disadvantage of such systems is that usually one audio file must end fully before the next one begins. Since many audio files have a long fade-out-period, this creates an effective gap between files. To avoid this disadvantage, a fully manual approach is required, where a user manually manipulates every aspect of cross-fading the audio files. The fully manual approach is time consuming and inefficient.

Accordingly, what is needed is an improved system and method for automatically cross-fading digital audio files. The improved automated cross-fader should automatically analyze the characteristics of digital audio files and cross-fade them appropriately. The present invention addresses such a need.

SUMMARY OF THE INVENTION

The present invention provides an improved system and method for cross-fading digital audio files. The method includes determining a plurality of characteristics for a first and a second digital audio files; associating the plurality of characteristics with the first and the second digital audio files; automatically, i.e., without user input, determining an appropriate cross-fading method for the first and the second digital audio files based upon the plurality of characteristics when the first and the second digital audio files are to be cross-faded; and automatically cross-fading the first and the second digital audio files in accordance with the cross-fading method. In this manner, digital audio files are more appropriately cross-faded without the need for cumbersome user input.

DETAILED DESCRIPTION

The present invention relates to an improved system and method for automatically cross-fading digital audio files. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The improved system and method for automatically cross-fading digital audio files in accordance with the present invention analyzes a plurality of characteristics of a plurality of digital audio files. The characteristics are automatically, i.e., without user input, associated with their respective digital audio files. Each time these digital audio files are cross-faded, their associated characteristics are used to automatically determine the appropriate cross-fading method. The digital audio files are then automatically cross-faded in accordance with the appropriate cross-fading method.

To more particularly describe the features of the present invention, please refer to FIGS. 1 through 6 in conjunction with the discussion below.

Figure 1:
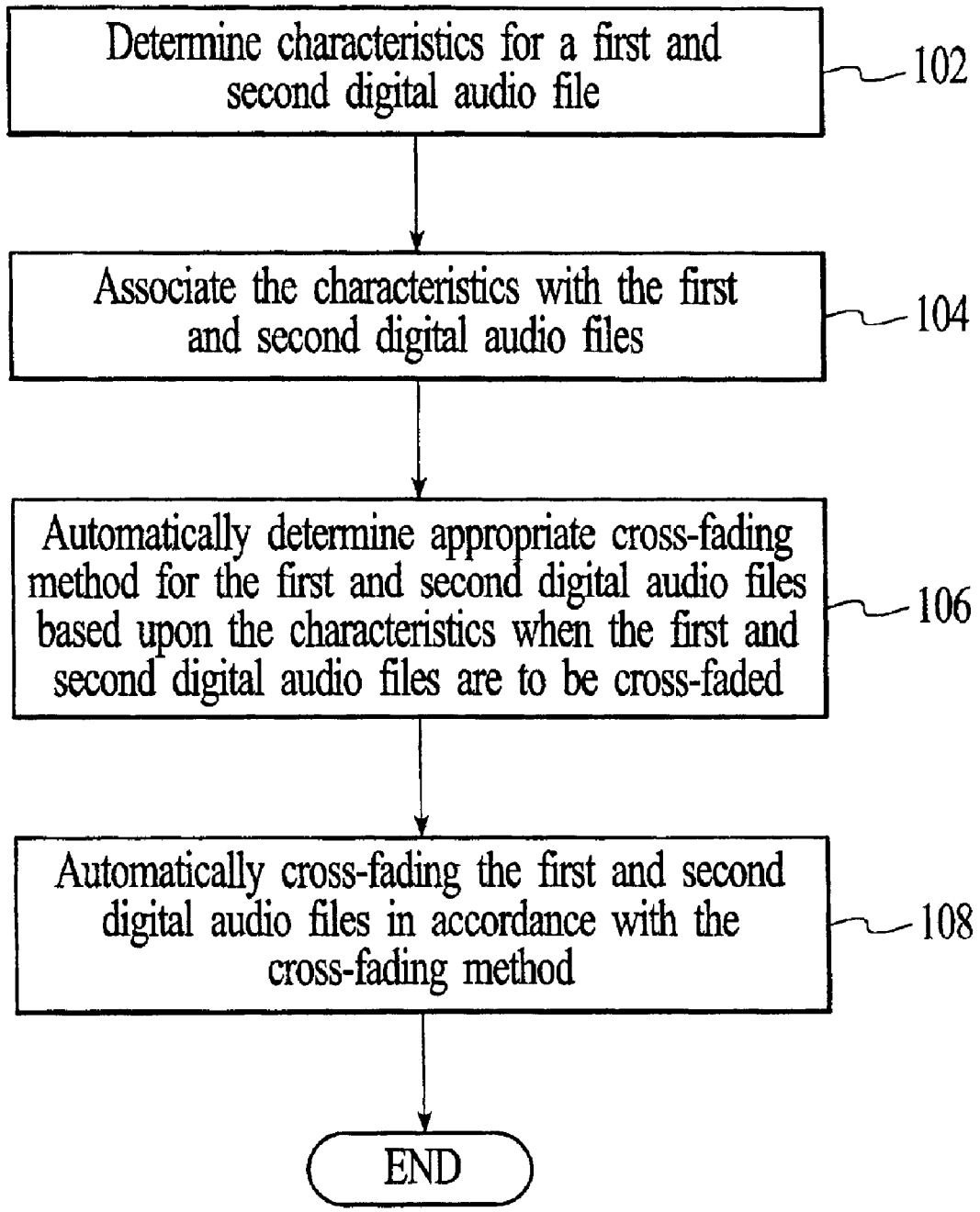
FIG. 1 is a flowchart illustrating a method for automatically cross-fading digital audio files in accordance with the present invention.

FIG. 1 is a flowchart illustrating a method for automatically cross-fading digital audio files in accordance with the present invention. First, the characteristics for a first and a second digital audio file are determined, via step 102. Next, the characteristics are associated with the first and second digital audio files, via step 104. Next, when the first and second digital audio files are to be cross-faded, possibly at a later time, the appropriate cross-fading method is automatically determined for the first and second digital audio files based upon the characteristics, via step 106. Then, the first and second digital audio files are automatically cross-faded in accordance with the cross-fading method, via step 108.

The method in accordance with the present invention may be implemented either as software or firmware of a playing device. For example, the method may be performed by an audio playing device, by audio playing software located on a personal computer or home entertainment system, or done as preprocessing by an MP3 selection/mixing/download software. The method may also be used by media providers, such as Internet radio stations or other fully-automated music providers. The digital audio files to be cross-faded may exist as data either in a personal computer or other repository or as temporary storage in the memory of the playing device.

The determined characteristics may be associated with its respective digital audio file by encoding them into the digital audio file itself as a header or footer tag. Alternatively, they may be created as a separate characteristics file. For example, a file called SONG1.MP3 may have files called SONG1.INT and SONG1.END associated with it that define the characteristics of the introduction and end of the song, respectively, or a single file called SONG1.FCH that describes all characteristics of the song to be used. Alternatively, the characteristics may be stored in a temporary memory, such as Random Access Memory (RAM).

Possible characteristics to be considered include the overall loudness level and the loudness trend (the amplitude envelope). Additionally, characteristics such as tempo, harmonic content, the presence/absence of a vocal, changes in tempo during a song, and the beat amplitude may be used to determine advanced cross-fading techniques. The fade-out level at which a new digital audio file begins may be controlled by the user through software parameters or preferences.

The characteristics for the first and the second digital audio files may be determined, via step 102, manually by a user or automatically without user input.

The method in accordance with the present invention may be used for a chain of digital audio files, where the second digital audio file is cross-faded with a subsequent digital audio file, and so forth. In this case, the second digital audio file becomes the "first digital audio file" in FIG. 1, and the subsequent digital audio file becomes the "second digital audio file" in FIG. 1.

Figure 2:
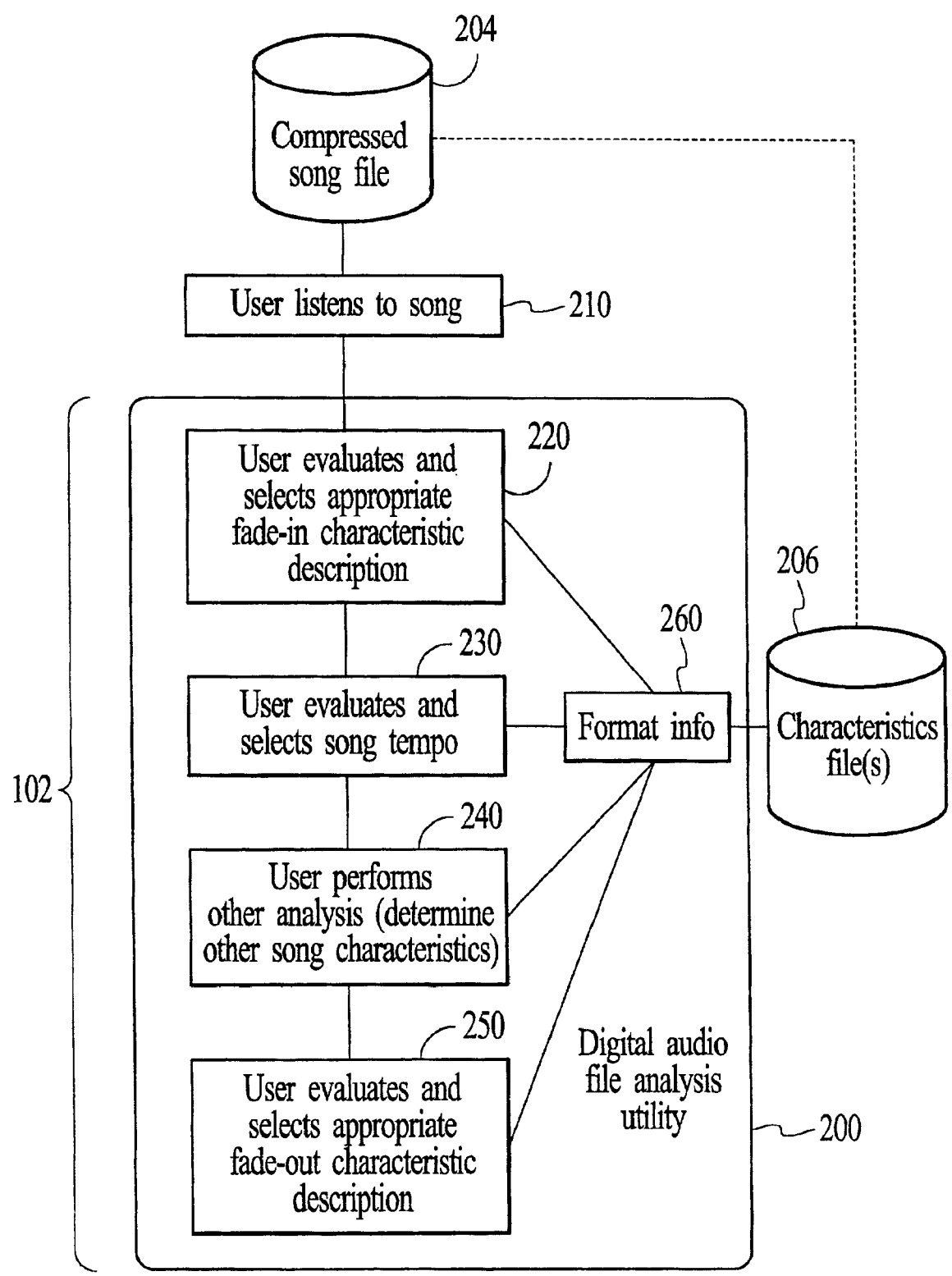
FIG. 2 illustrates a preferred embodiment for manually determining the characteristics for a first and a second digital audio file in the method for automatically cross-fading digital audio files in accordance with the present invention.

FIG. 2 illustrates a preferred embodiment for manually determining the characteristics for a first and a second digital audio file in the method for automatically cross-fading digital audio files in accordance with the present invention. Here, the user manually determines the characteristics to be utilized in the cross-fading. In this embodiment, a digital audio file analysis utility 200 provides a pre-defined user interface with which the user manually determines the characteristics for the first and second digital audio files. For example, assume that the digital audio files are compressed song files 204, although the song files 204 need not be compressed. The user listens to the song files 204, via step 210, and evaluates and selects the appropriate fade-in characteristic description, via step 220. The user also can evaluate and select other characteristics, such as the song tempo, via steps 230 and 240. The user then evaluates and selects the appropriate fade-out characteristic description, via step 250.

The utility 200 formats the manually determined characteristics, via step 260. These characteristics may either be stored as separate characteristics files 206, or as a header or addendum to the song files 204 themselves. The characteristics files 206 may also be multiple files, each describing a particular characteristic of the analyzed songs. The characteristics files 206 are then associated with the song files 204, via step 104. Each time the song files 204 are to be cross-faded, their associated characteristics are used to automatically determine the appropriate cross-fading method for the song files 204, via step 106. The song files 204 are then automatically cross-faded in accordance with this method, via step 108.

Figure 3:
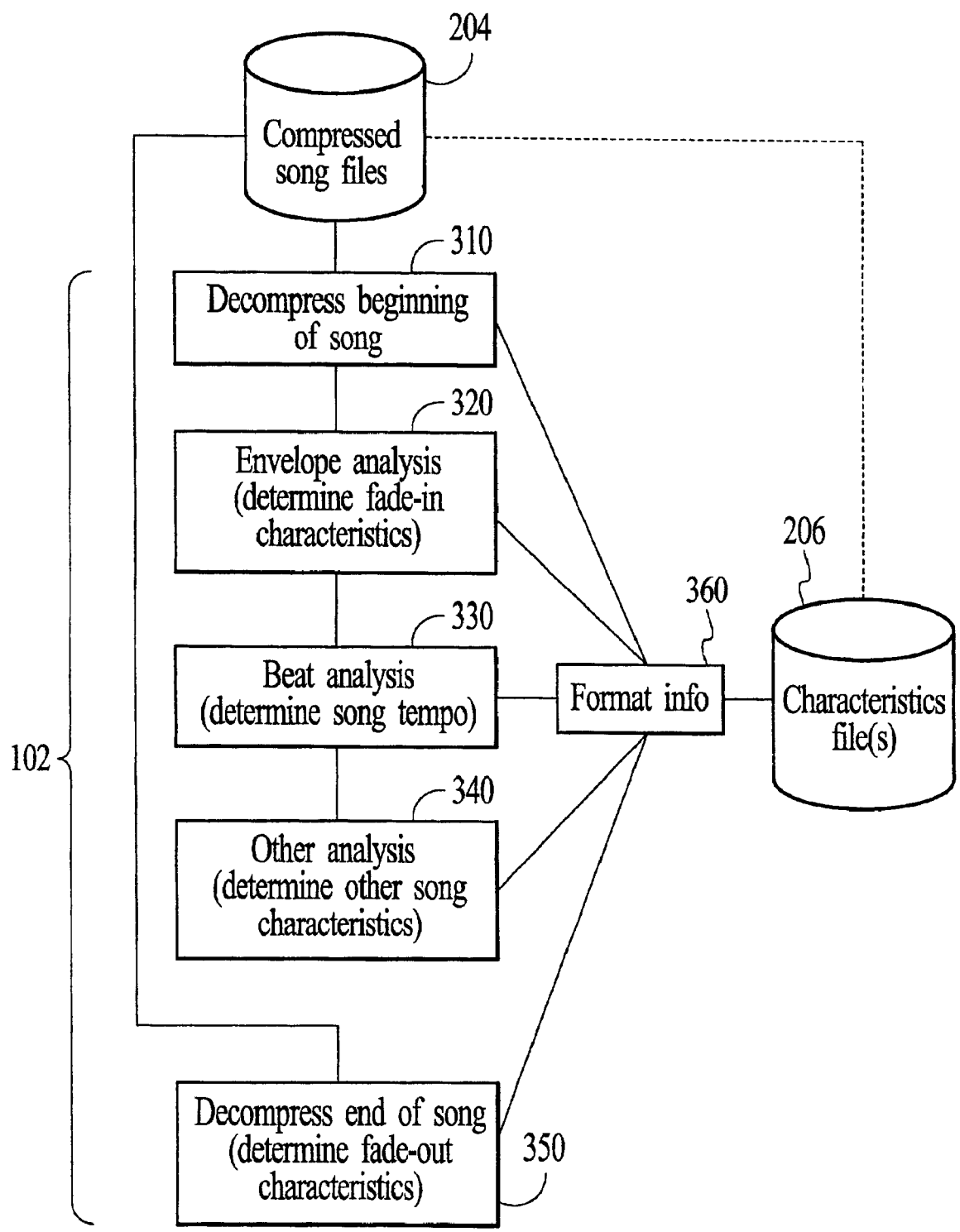
FIG. 3 illustrates a preferred embodiment for automatically determining the characteristics for a first and a second digital audio file in the method for automatically cross-fading digital audio files in accordance with the present invention.

FIG. 3 illustrates a preferred embodiment for automatically determining the characteristics for a first and a second digital audio file in the method for automatically cross-fading digital audio files in accordance with the present invention. In this preferred embodiment, the characteristics utilized in the cross-fading is determined in an automated fashion, i.e., without user input. The digital audio files are accessed and decompressed (if necessary) and analyzed for the sound content. Various known audio analysis techniques can be used to determine the characteristics of the start and end of the digital audio files.

For example, assume again that the digital audio files are compressed song files 204. In determining the characteristics for the song files 204, the beginning of the song files 204 are automatically decompressed, via step 310. Next, the "envelope" of the song files 204 is analyzed to determine the fade-in characteristics, via step 320. As is known in the art, the "envelope" of a song file is a representation of the audio amplitude characteristics versus time. Then, other characteristics, such as the song tempo, are analyzed, via steps 330 and 340. The end of the song files 204 is then decompressed to determine the fade-out characteristics, via step 350.

The determined characteristics are then automatically formatted, via step 360. Again, these characteristics may either be stored as separate characteristics files 206, or as a header or addendum to the song files 204 themselves, and may be multiple files. The characteristics files 206 are then associated with the song files 204, via step 104. Each time the song files 204 are to be cross-faded, their associated characteristics are used to automatically determine the appropriate cross-fading method for the song files 204, via step 106. The song files 204 are then automatically cross-faded in accordance with this method, via step 108.

Figure 4A:
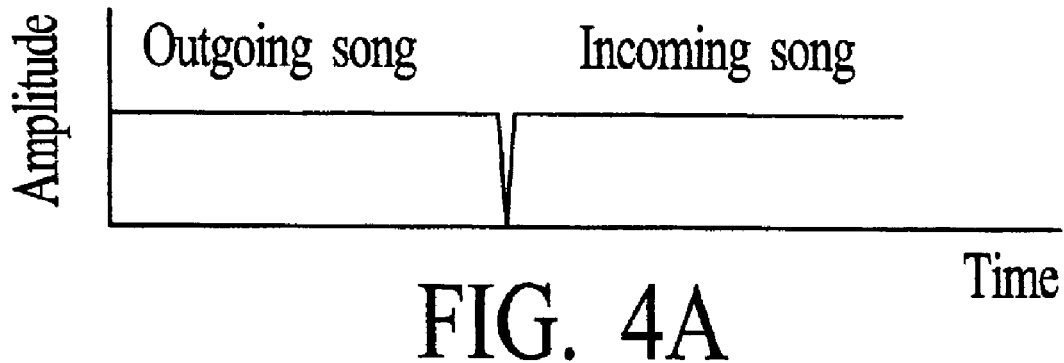
FIGS. 4A–4C illustrate example cross-fading methods which may be used in the method for automatically cross-fading digital audio files in accordance with the present invention.
Figure 4B:
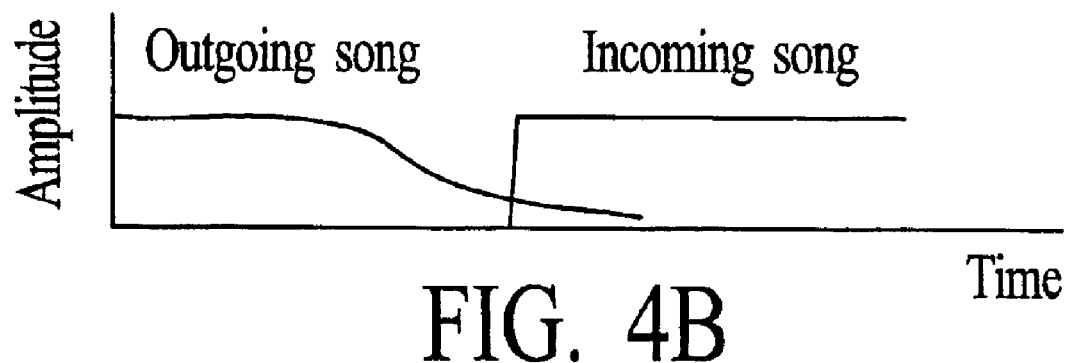
Figure 4C:
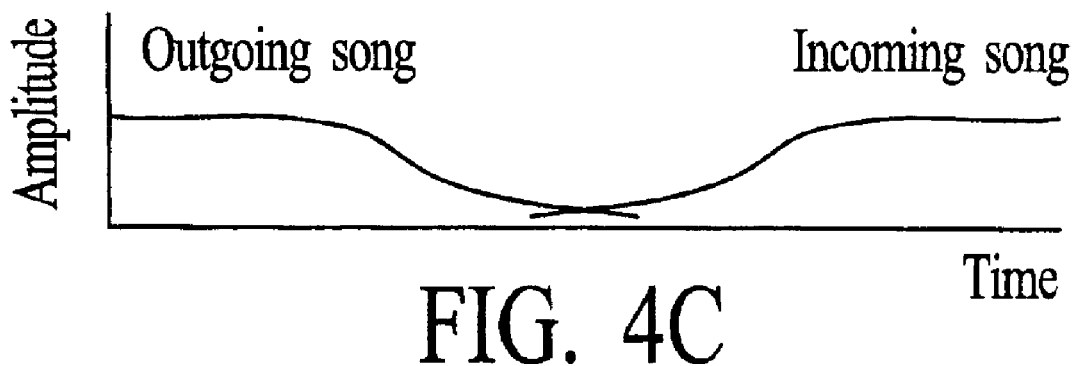

FIGS. 4A–4C illustrate example cross-fading methods which may be used in the method for automatically cross-fading digital audio files in accordance with the present invention. In each method, the lines represent the envelope of the digital audio files to be cross-faded. Assume again that the digital audio files are song files. In FIG. 4A, the outgoing song is determined to end abruptly (no fade-out), and the incoming song begins abruptly at full volume. The appropriate cross-fade is a fade-to-back presentation with no overlap and little elapsed time between songs. In FIG. 4B, the outgoing song fades out, while the incoming song begins abruptly. The appropriate cross-fade is to begin the incoming song as the outgoing song reaches a pre-determined level of fade out. In FIG. 4C, the outgoing song again fades out, but the incoming song is determined to start at a relatively low level. In this case the appropriate cross-fade is to hold the start of the incoming song until the outgoing song is nearly complete. Although the example methods utilizing the beginning and ending envelopes of the song files to determine the appropriate fading technique as an example, other characteristics of the songs could be used in other situations.

Figure 5:
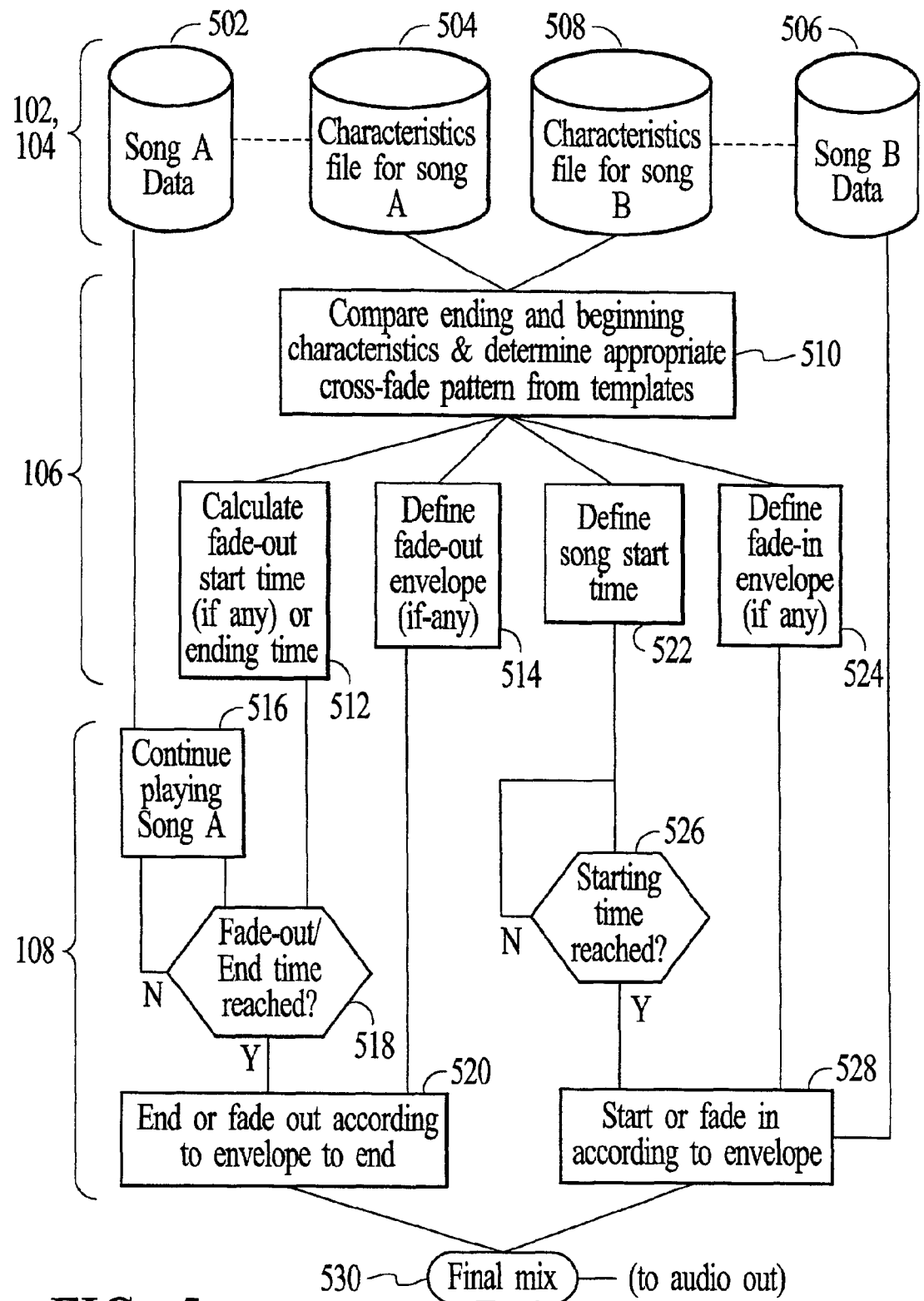
FIG. 5 illustrates in more detail a first preferred embodiment of the method for automatically cross-fading digital audio files in accordance with the present invention.

FIG. 5 illustrates in more detail a first preferred embodiment of the method for automatically cross-fading digital audio files in accordance with the present invention. Assume that the first digital audio file is song 502 and the second digital audio file is song 506. First, characteristics for song 502 and song 506 are determined, via step 102. Either method described above in relation to FIGS. 2 and 3 may be used to determine the characteristics. These characteristics are associated with songs 502 and 506, via step 104, either as separate characteristics files 504 and 508, respectively, or as a header or addendum to the songs 502 and 506 themselves.

Then, when the songs 502 and 506 are to be cross-faded, the appropriate cross-fading method for the songs 502 and 506 are automatically determined based upon the characteristics, via step 106. In determining the appropriate cross-fading method, the ending and beginning characteristics of songs 502 and 506 are compared, via step 510. The appropriate cross-fade pattern is also determined from templates. Assuming that song 502 is to fade into song 506, the fade-out start time or the ending time for song 502 is calculated, via step 512, according to the cross-fade pattern. The fade-out envelope is defined for song 502, via step 514. Also, the start time and the fade-in envelope is defined for song 506, via steps 522 and 524, respectively, according to the cross-fade pattern.

To automatically cross-fade songs 502 and 506 in accordance with the cross-fading method, via step 108, song 502 first continues to play, via step 516, until the fade-out or end time is reached, via step 518. Then song 502 is ended or faded out according to its envelope, via step 520. For song 506, when the starting time is reached, via step 526, song 506 is started or faded in according to its envelope, via step 528. This provides the final mix 530.

Figure 6:
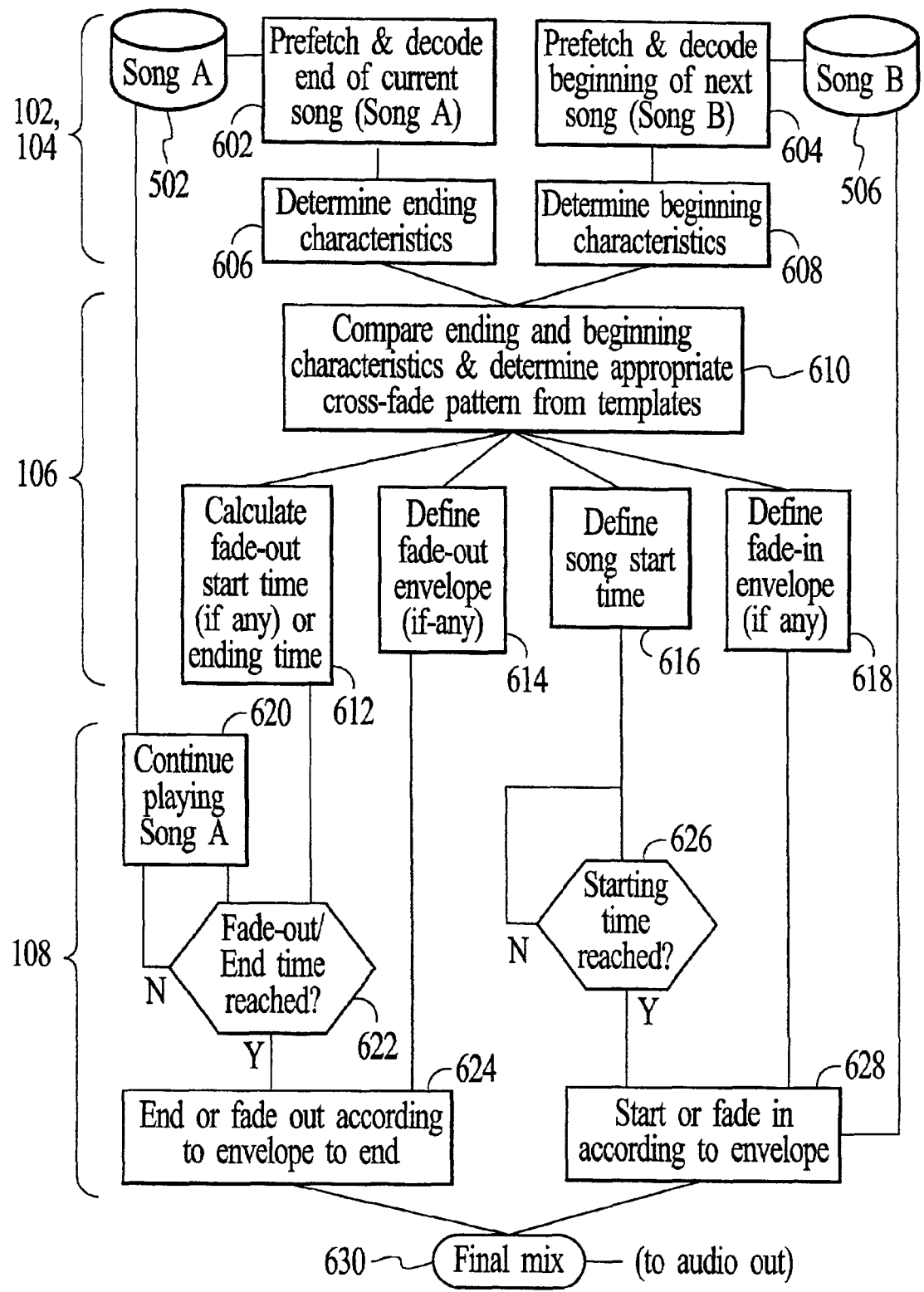
FIG. 6 illustrates in more detail a second preferred embodiment of the method for automatically cross-fading digital audio files in accordance with the present invention.

FIG. 6 illustrates in more detail a second preferred embodiment of the method for automatically cross-fading digital audio files in accordance with the present invention. In this second preferred embodiment, the method is implemented "on the fly", i.e., while the first and second digital audio files as playing in real-time. This technique has the advantage of not requiring additional files or file addenda.

Assume again that the first digital audio file is song 502 and the second digital audio file is song 506 and that song 502 is to be faded into song 506. To determine the characteristics for songs 502 and 506, via step 102, and to associate the characteristics with the songs 502 and 506, via step 104, first the end of the current song 502 is prefetched and decoded, via step 602. Also, the beginning of the next song 506 is prefetched and decoded, via step 604. Then, the ending characteristics of song 502 are determined, via step 606. Also, the beginning characteristics of song 506 are determined, via step 608.

Next, the appropriate cross-fading method is automatically determined for the songs 502 and 506 based upon the ending and beginning characteristics, via step 106. In determining the appropriate cross-fading method, the ending and beginning characteristics of songs 502 and 506 are compared, via step 610. The appropriate cross-fade pattern is also determined from templates. The method calculates the fade-out start time or the ending time for song 502, via step 612, according to the cross-fade pattern. The fade-out envelope is defined for song 502, via step 614. Also, the start time and the fade-in envelope is defined for song 506, via steps 616 and 618, respectively, according to the cross-fade pattern.

To automatically cross-fade songs 502 and 506 in accordance with the cross-fading method, via step 108, song 502 first continues to play, via step 620, until the fade-out or end time is reached, via step 622. Then song 502 is ended or faded out according to its envelope, via step 624. For song 506, when the starting time is reached, via step 626, song 506 is started or faded in according to its envelope, via step 628. This provides the final mix 630.

The embodiments described in FIGS. 5 and 6 may also be combined, such that one song utilizing the first preferred embodiment described in FIG. 5 is cross-faded with another song utilizing the second preferred embodiment described in FIG. 6.

In addition to the above, the characteristics of the digital audio files may be used to select or reject songs from a playlist or data stream as compatible or incompatible with one another or with characteristics set by the user. For instance, the method in accordance with the present invention may determine that a transition between a fast, loud song to a soft, slow song would be unacceptable and selects another song to follow, or the user may select "fast" songs only and the tempo determination would be used to find songs which comply.

A system and method for automatically cross-fading digital audio files has been disclosed. The present invention analyzes the characteristics of a plurality of digital audio files. The characteristics are automatically, i.e., without user input, associated with their respective digital audio files. These associated characteristics are then used to automatically determine the appropriate cross-fading method when the digital audio files are to be cross-faded. The digital audio files are then automatically cross-faded in accordance with the appropriate cross-fading method. In this manner, digital audio files are more appropriately cross-faded without the need for cumbersome user input.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for cross-fading digital audio, comprising the steps of:
    (a) determining a plurality of characteristics for a first and a second digital audio files;
    (b) associating the plurality of characteristics with the first and the second digital audio files and storing the plurality of characteristics in at least one characteristics file associated with the first or the second digital audio file;
    (c) automatically determining an appropriate cross-fading method for the first and the second digital audio files based upon the plurality of characteristics when the first and the second digital audio files are to be cross-faded; and
    (d) automatically cross-fading the first and the second digital audio files in accordance with the cross-fading method.

2. The method of claim 1, wherein the determining step (a) comprises:
    (a1) determining the plurality of characteristics by a user for the first and the second digital audio files.

3. The method of claim 1, wherein the determining step (a) comprises:
    (a1) automatically decompressing a beginning of the second digital audio file;
    (a2) automatically analyzing an envelope of the second digital audio file to determine a fade-in characteristic;
    (a3) automatically decompressing an end of the first digital audio file to determine a fade-out characteristic; and
    (a4) automatically analyzing the first and the second digital audio files for others of the plurality of characteristics.

4. The method of claim 1, wherein the determining step (a) comprises:
    (a1) automatically prefetching and decoding an end of the first digital audio file;
    (a2) automatically determining an ending characteristic of the first digital audio file;
    (a3) automatically prefetching and decoding a beginning of the second digital audio file; and
    (a4) automatically determining a beginning characteristic of the second digital audio file.

5. The method of claim 1, wherein the automatically determining step (c) comprises:
    (c1) comparing an ending characteristic for the first digital audio file with a beginning characteristic for the second digital audio file;

(c2) determining the appropriate cross-fading method based upon the comparing step (c 1);

(c3) calculating a fade-out start time or an ending time for the first digital audio file;

(c4) defining an envelope for the first digital audio file;

(c5) defining a start time for the second digital audio file; and (c6) defining an envelope for the second digital audio file.

6. The method of claim 1, wherein the automatically cross-fading step (d) comprises:

(d1) fading out or ending the first digital audio file according to an envelope of the first digital audio file when a fade-out time or an ending time is reached; and (d2) starting or fading in the second digital audio file according to an envelope of the second digital audio file when a start time is reached.

7. A method for cross-fading digital audio, comprising the steps of:

(a) determining a plurality of characteristics by a user for a first and a second digital audio files;

(b) associating the plurality of characteristics with the first and the second digital audio files and storing the plurality of characteristics in at least one characteristics file associated with the first and the second digital audio files;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

8. The method of claim 7, wherein the automatically determining step (c) comprises:

(c1) comparing an ending characteristic for the first digital audio file with a beginning characteristic for the second digital audio file;

(c2) determining the appropriate cross-fading method based upon the comparing step (c1);

(c3) calculating a fade-out start time or an ending time for the first digital audio file;

(c4) defining an envelope for the first digital audio file;

(c5) defining a start time for the second digital audio file; and (c6) defining an envelope for the second digital audio file.

9. The method of claim 7, wherein the automatically cross-fading step (d) comprises:

(d1) fading out or ending the first digital audio file according to an envelope of the first digital audio file when a fade-out time or an ending time is reached; and (d2) starting or fading in the second digital audio file according to an envelope of the second digital audio file when a start time is reached.

10. A method for cross-fading digital audio, comprising the steps of:

(a) automatically determining a plurality of characteristics for a first and a second digital audio files, comprising:

(a1) decompressing a beginning of the second digital audio file, (a2) analyzing an envelope of the second digital audio file to determine a fade-in characteristic of the plurality of characteristics, (a3) decompressing an end of the first digital audio file to determine a fade-out characteristic of the plurality of characteristics, and (a4) determining others of the plurality of characteristics;

(b) associating the plurality of characteristics with the first and the second digital audio files and storing the plurality of characteristics in at least one characteristics file associated with the first or the second digital audio file;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

11. The method of claim 10, wherein the automatically determining step (c) comprises:

(c1) comparing an ending characteristic for the first digital audio file with a beginning characteristic for the second digital audio file;

(c2) determining the appropriate cross-fading method based upon the comparing step (c 1);

(c3) calculating a fade-out start time or an ending time for the first digital audio file;

(c4) defining an envelope for the first digital audio file;

(c5) defining a start time for the second digital audio file; and (c6) defining an envelope for the second digital audio file.

12. The method of claim 10, wherein the automatically cross-fading step (d) comprises:

(d1) fading out or ending the first digital audio file according to an envelope of the first digital audio file when a fade-out time or an ending time is reached; and (d2) starting or fading in the second digital audio file according to an envelope of the second digital audio file when a start time is reached.

13. A method for cross-fading digital audio, comprising the steps of:

(a) automatically determining a plurality of characteristics for a first and a second digital audio files, comprising:

(a1) prefetching and decoding an end of the first digital audio file, (a2) determining an ending characteristic of the first digital audio file, (a3) prefetching and decoding a beginning of the second digital audio file, and (a4) determining a beginning characteristic of the second digital audio file, (b) automatically associating the plurality of characteristics with the first and the second digital audio files and storing the plurality of characteristics in at least one characteristics file associated with the first or the second digital audio files;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

14. The method of claim 13, wherein the automatically determining step (c) comprises:

(c1) comparing the ending characteristic for the first digital audio file with the beginning characteristic for the second digital audio file;

(c2) determining the appropriate cross-fading method based upon the comparing step (c1);

(c3) calculating a fade-out start time or an ending time for the first digital audio file;

(c4) defining an envelope for the first digital audio file;

(c5) defining a start time for the second digital audio file; and (c6) defining an envelope for the second digital audio file.

15. The method of claim 13, wherein the automatically cross-fading step (d) comprises:

(d1) fading out or ending the first digital audio file according to an envelope of the first digital audio file when a fade-out time or an ending time is reached; and (d2) starting or fading in the second digital audio file according to an envelope of the second digital audio file when a start time is reached.

16. A computer readable medium with program instructions for cross-fading digital audio, the instructions for:

(a) determining a plurality of characteristics for a first and a second digital audio files;

(b) associating the plurality of characteristics with the first and the second digital audio files and storing the plurality of characteristics in at least one characteristics file associated with the first or the second digital audio file;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

17. A computer readable medium with program instructions for cross-fading digital audio, the instructions for:

(a) automatically determining a plurality of characteristics for a first and a second digital audio files, comprising:

(a1) decompressing a beginning of the second digital audio file, (a2) analyzing an envelope of the second digital audio file to determine a fade-in characteristic of the plurality of characteristics, (a3) decompressing an end of the first digital audio file to determine a fade-out characteristic of the plurality of characteristics, and (a4) determining others of the plurality of characteristics;

(b) associating the plurality of characteristics with the first and the second digital audio files and storing the plurality of characteristics in at least one characteristics file associated with the first or the second digital audio file;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

18. A computer readable medium with program instructions for cross-fading digital audio, the instructions for:

(a) automatically determining a plurality of characteristics for a first and a second digital audio files, comprising:

(a1) prefetching and decoding an end of the first digital audio file, (a2) determining an ending characteristic of the first digital audio file, (a3) prefetching and decoding a beginning of the second digital audio file, and (a4) determining a beginning characteristic of the second digital audio file, (b) automatically associating the plurality of characteristics with the first and the second digital audio files and storing the plurality of characteristics in at least one characteristics file associated with the first or the second digital audio file;

(c) automatically determining an appropriate cross-fading method for the first and the second digital audio files based upon the plurality of characteristics when the first and the second digital audio files are to be cross-faded; and (d) automatically cross-fading the first and the second digital audio files in accordance with the cross-fading method.

19. A system, comprising:

a first digital audio file;

a second digital audio file; and a playing device, wherein the playing device determines a plurality of characteristics for the first and a second digital audio files, associates the plurality of characteristics with the first and the second digital audio files and storing the plurality of characteristics in at least one characteristics file associated with the first or the second digital audio file, automatically determines an appropriate cross-fading method for the first and the second digital audio files based upon the plurality of characteristics when the first and the second digital audio files are to be cross-faded, and automatically cross-fades the first and the second digital audio files in accordance with the cross-fading method.

* * * * *